US005601274A

United States Patent [19]
Minor et al.

[11] Patent Number: 5,601,274
[45] Date of Patent: Feb. 11, 1997

[54] VIBRATION ISOLATING LIGHTING POLE BRACKET ARM

[75] Inventors: Ray C. Minor; Phillip R. Shaffer, both of Abingdon, Va.

[73] Assignee: Kearney-National, Inc., White Plains, N.Y.

[21] Appl. No.: 489,717

[22] Filed: Jun. 13, 1995

[51] Int. Cl.$^6$ .................................................. F16M 13/00
[52] U.S. Cl. .................. 248/594; 248/219.1; 248/354.1; 362/390; 362/431
[58] Field of Search .................................. 248/594, 592, 248/577, 218.4, 219.1, 351, 354; 362/431, 390, 427

[56] References Cited

U.S. PATENT DOCUMENTS

| | | | |
|---|---|---|---|
| 2,966,324 | 12/1960 | Heinzen | 248/219.1 |
| 3,050,620 | 8/1962 | Schlosser et al. | 362/431 |
| 3,321,160 | 5/1967 | Turnbull | 248/219.1 X |
| 4,221,353 | 9/1980 | Kuhn et al. | 248/292.11 |
| 5,054,725 | 10/1991 | Bucefari et al. | 248/123.1 |
| 5,171,088 | 12/1992 | Tellier et al. | 362/431 X |

*Primary Examiner*—Ramon O. Ramirez
*Attorney, Agent, or Firm*—Reid & Priest L.L.P.

[57] ABSTRACT

A lighting pole bracket arm isolates vibrations that would otherwise pass through the lighting pole and into a lighting fixture mounted on the lighting pole. The bracket arm includes an upper member which is pivotally mounted to the lighting pole and a lower telescopic member, which is pivotally mounted to the lighting pole at a position below the upper member pivotal mount. The lower telescopic member includes an inner tube that is slidably received within an outer tube. A cylindrical oil-free sleeve bearing is press fit over the end of the inner tube that is received within the outer tube, and a second cylindrical oil-free sleeve bearing is press fit into the end of the outer tube that fits over the inner tube. A coil spring is housed within the outer tube between a closed end of the outer tube opposite from the end having the sleeve bearing and the end of the inner tube slidably received within the outer tube. The combination of the coil spring and the sleeve bearings results in a damping of any vibrations passed through the lower member from the lighting pole to the lighting fixture.

8 Claims, 4 Drawing Sheets

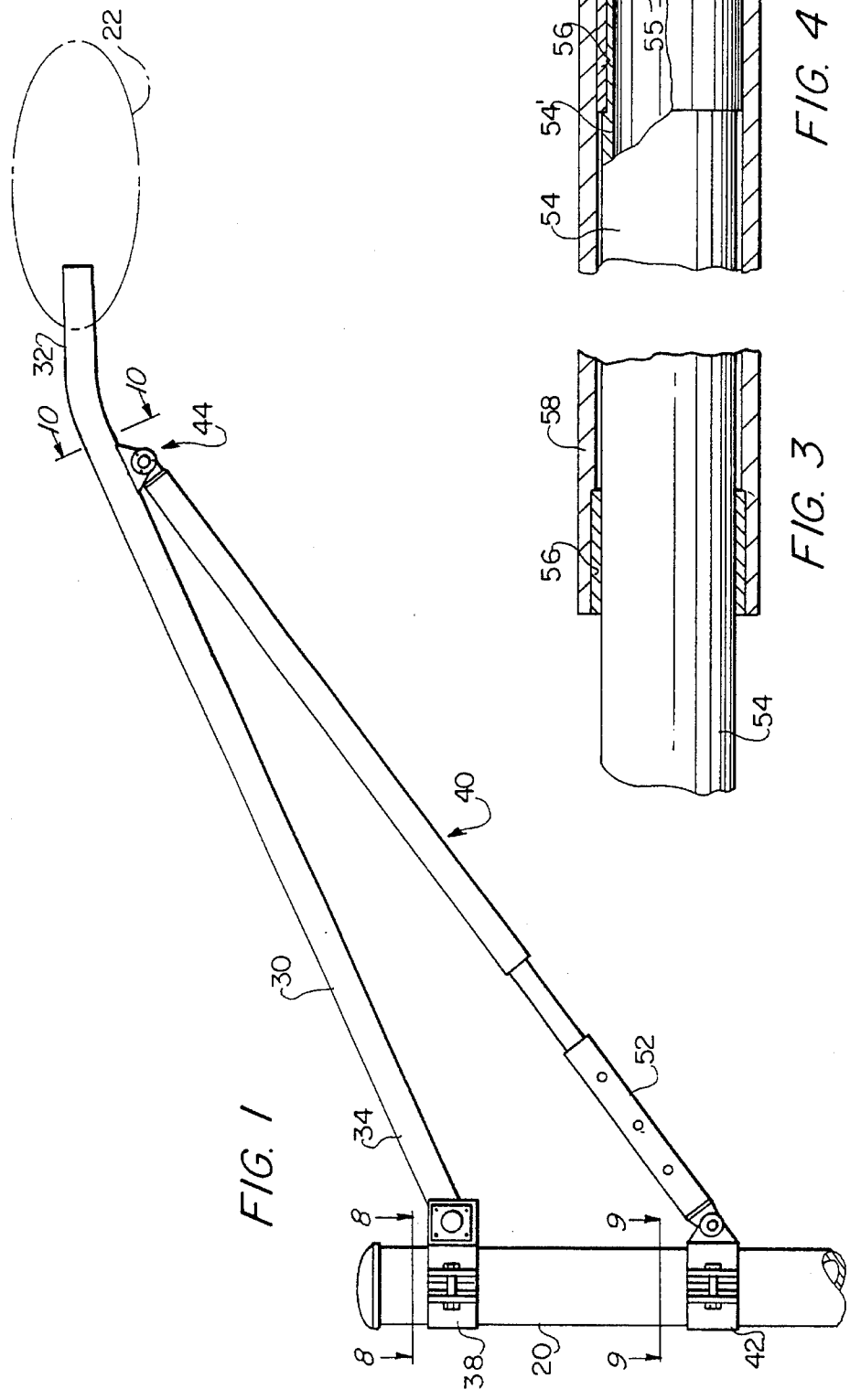
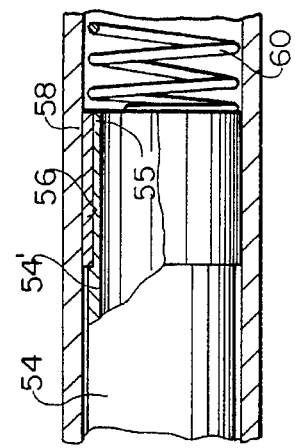
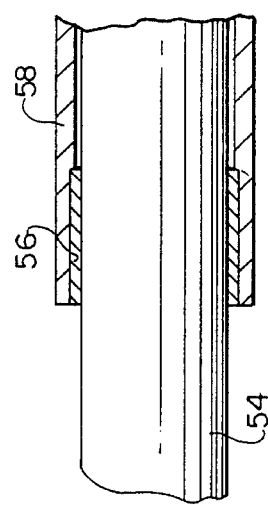
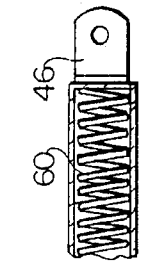
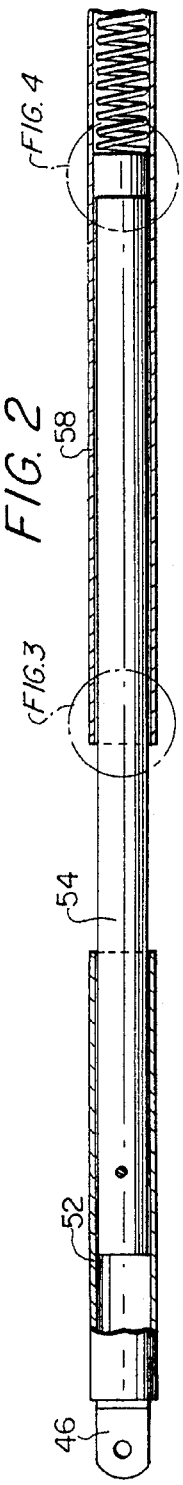

VIBRATION ISOLATING LIGHTING POLE BRACKET ARM

BACKGROUND OF THE INVENTION

1. Field of the Invention

The present invention relates to lighting poles. More specifically, the invention relates to a vibration isolating bracket arm assembly mounted to the lighting pole for supporting a light fixture.

2. Related Art

It is known to provide a street lamp with a vertical post, a transverse arm pivotally attached to the vertical post and supporting a lighting device, and even, as shown in U.S. Pat. No. 5,171,088 to provide a second arm attached to the vertical post and the transverse arm for the purpose of adjusting the angle of the transverse arm relative to the vertical post. However, known lighting pole structures have experienced the problem of premature lamp failure as a result of excessive vibrations of the lighting poles. Vibration of structures on which the lighting poles are mounted, such as bridges, sometimes produces first, second and third mode vibrations of the lighting poles. The natural frequencies of these lighting poles typically range between one cycle per second (during a first mode vibration) and fifteen cycles per second (during a third mode vibration). Vibration of the lighting pole is most severe when the natural frequencies of the structure supporting the lighting pole are at or near one or more of the natural frequencies of the lighting pole. When a lighting pole is mounted on a bridge or highway overpass, vibration is caused by passing vehicles. This vibration is primarily vertical in direction and often results in premature lamp failure or failure of bracket arms supporting the lamps.

SUMMARY OF THE INVENTION

Therefore, it is an object of the present invention to provide a light fixture support which has a natural frequency below the range of frequencies that result in damage to the light fixture. The lighting pole of the present invention includes a bracket arm assembly for supporting the lighting fixture wherein the bracket arm assembly includes a spring tube arm having telescoping inner and outer tubes and means for biasing one of the inner and outer tubes relative to the other, as well as means for damping relative motion between the inner and outer tubes.

The spring tube arm of the present invention provides an effective means for reducing the transmission of structural vibrations of the lighting pole through the bracket arm and into the lighting fixture. The spring tube arm is an integral part of the bracket arm assembly and has the advantage of greatly increasing the life of the lighting fixture and reducing the risk of having parts from the assembly fall onto a roadway below the lighting pole.

A vibration isolating lighting pole bracket arm according to the present invention includes an upper member extending transversely from a vertically oriented light pole, and a lower member that is pivotally attached at one end to the light pole and at the other end to the upper member. A lighting fixture is supported at the end of the upper member opposite from the end of the upper member that is pivotally attached to the vertical light pole. The lower member is pivotally attached to the vertical light pole at a first end and is pivotally attached at a second end to the upper member at a point adjacent to the lighting fixture. The pivotal attachments at both ends of the upper and lower members include aluminum lugs which are connected to the vertical light pole or to the upper member. Aluminum lugs are connected to the light pole through the use of band assemblies. The pivotal attachments also include special oil-free flange bearings such as the self-lubricating flange bearings sold under the trademark "IGLIDE" by Igus, Inc.

The lower member comprises a lower tube assembly, which is pivotally connected to the vertical light pole; an inner tube that fits inside of the lower tube assembly at a first end of the inner tube and has a special oil-free sleeve bearing, preferably of the type sold under the trademark "IGLIDE" by Igus, Inc.) pressed over a reduced diameter portion at a second end of the inner tube; and an outer tube that fits telescopically over the end of the inner tube having a sleeve bearing. The outer tube also has a sleeve bearing pressed into a counterbore at a first end of the outer tube with the outer tube sleeve bearing being slidably engaged with the outer diameter of the inner tube. A coil spring is contained within the outer tube between the closed second end of the outer tube and the second end of the inner tube having a sleeve bearing.

The entire lower member assembly forms a vibration isolating member as vibrations received from the vertical light pole are damped out by the combination of the coil spring and the close fit between the sleeve bearings and the inner and outer tubes. Like the oil-free flange bearings used for the pivotal attachments of the upper and lower members to the vertical light pole and to each other, the sleeve bearings within the lower member are preferably selected from bearings made from self-lubricating materials such as the oil-free sleeve bearings sold under the trademark "IGLIDE" by Igus, Inc.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 illustrates a side elevation view of the upper portion of a lighting pole with a vibration isolating lighting pole bracket arm assembly according to the present invention.

FIG. 2 illustrates a side elevation view in partial cross-section of the lower member of the vibration isolating lighting pole bracket arm assembly shown on FIG. 1.

FIG. 3 is an enlarged side elevation view in partial cross-section of the portion of FIG. 2 showing the sleeve bearing contained within a first end of the outer tube.

FIG. 4 is an enlarged side elevation view in partial cross-section of the portion of FIG. 2 showing the sleeve bearing pressed over one end of the inner tube and the coil spring contained within the outer tube of the lower member.

DETAILED DESCRIPTION OF THE PREFERRED EMBODIMENTS

Figure 5:
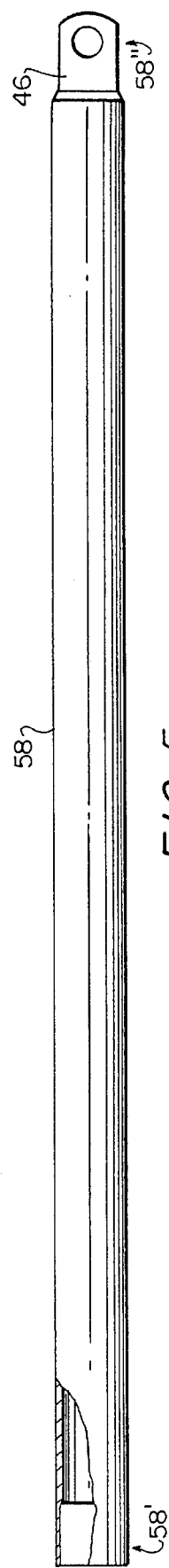
FIG. 5 is a side elevation view of the outer tube of the lower member in partial cross-section, showing the sleeve bearing press fit into one end of the outer tube.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring initially to FIG. 1, a preferred embodiment of the subject vibration isolating lighting pole bracket arm is shown. A vertical light pole 20 supports a cantilevered upper member 30 and a lower bracing member 40 that is pivotally attached to upper member 30 adjacent a distal end 32 of upper member 30. A lighting fixture 22 is connected to upper member 30 in well known fashion at distal end 32 of upper member 30. Upper member 30 is pivotally connected to vertical light pole 20 at a proximal end 34 of upper member 30 in the manner shown in FIG. 8.

Figure 8:
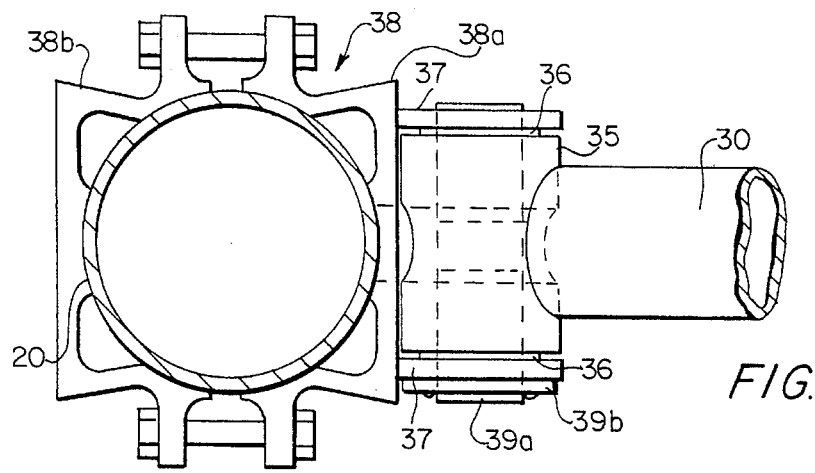
FIG. 8 is a partial cross-sectional view of the upper band assembly and pivotal mount for the upper member taken in the direction of arrows 8—8 in FIG. 1.
Figure 9:
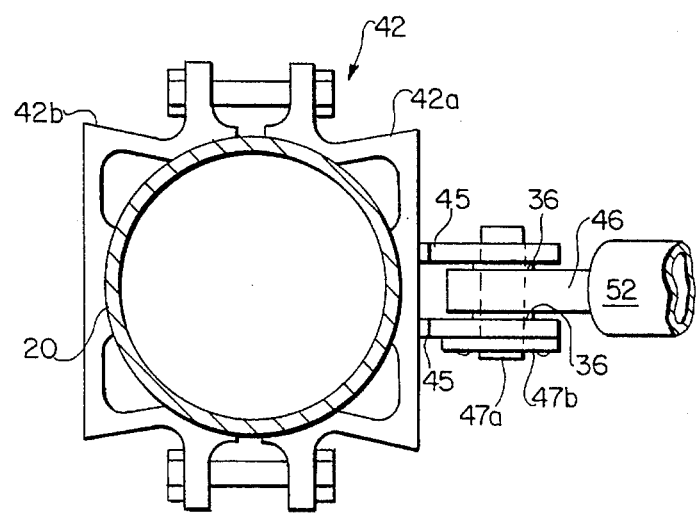
FIG. 9 is a partial cross-sectional view of the lower band assembly and pivotal mount for the lower member taken in the direction of arrows 9—9 in FIG. 1.
Figure 13:
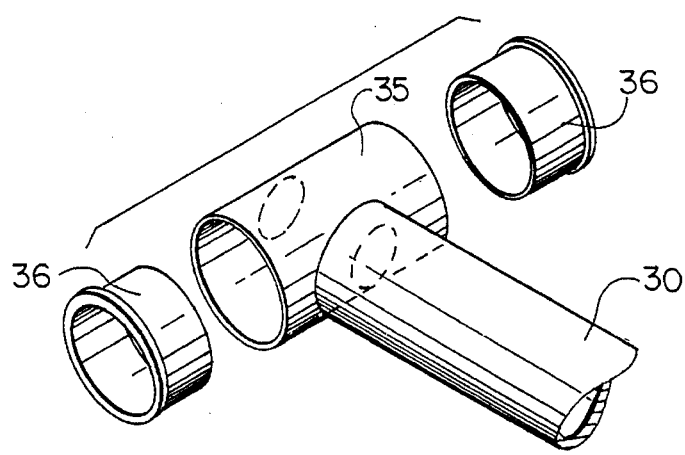
FIG. 13 is an exploded isometric view of the end of the upper member having a pipe segment welded at right angles to the upper member and showing the oil-free flange bearings that are press fit into each axial end of the pipe segment.

Proximal end 34 of upper member 30 is welded to a short segment of pipe 35 that is oriented at a right-angle to the axis of upper member 30 as shown in FIG. 13. Oil-free flange bearings 36, preferably of the type sold under the trademark "IGLIDE", which can be obtained from IGUS, Inc., are press fit into both axial ends of the pipe segment 35. Oil-free flange bearings 36 form a smooth bearing interface between the opposite axial ends of pipe segment 35 and two parallel aluminum plates 37 that are welded at right angles to a portion 38a of an upper band assembly 38 which is designed to clamp around the outer circumference of vertical light pole 20, as shown in FIGS. 8 and 9. In addition to forming a bearing surface between the axial ends of pipe segment 35 and aluminum plates 37, oil-free flange bearings 36 form a bearing surface between the inner diameter of pipe segment 35 and the outer diameter of a pin 39a which is part of an upper pin assembly 39, shown in FIG. 11.

Figure 11:
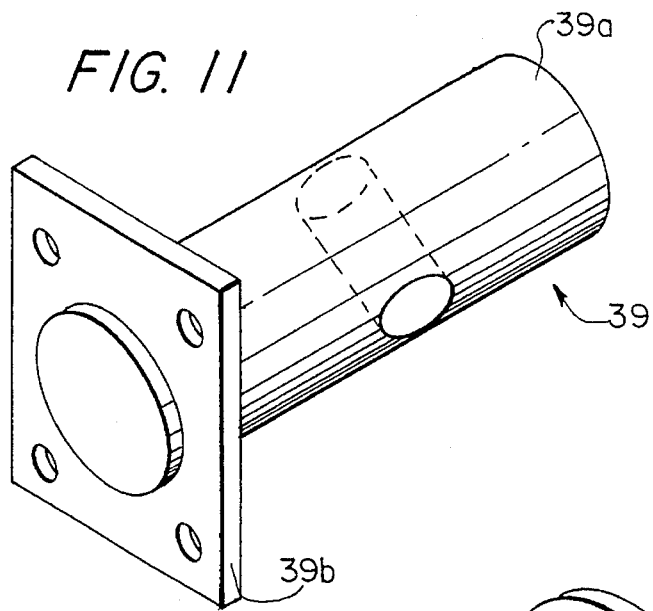
FIG. 11 is an isometric view of the upper pin assembly used in the pivotal connection between the upper member and the upper band assembly.

Upper pin assembly 39 also includes an end-plate 39b, shown in FIG. 11, attached perpendicular to one end of pin 39a and forming means for attaching upper pin assembly 39 to one of the aluminum plates 37. End plate 39b is bolted to one of the aluminum plates 37 with pin 39a extending through pipe segment 35 and through oil-free flange bearings 36. As shown in FIG. 13, pipe segment 35 is provided with two holes spaced at 180 degrees from each other and extending through the walls of pipe segment 35 at right angles to the axis of pipe segment 35, which allows for the passage of electrical wiring from light pole 20 into upper member 30 and then along the inside of upper member 30 to lighting fixture 22.

Figure 10:
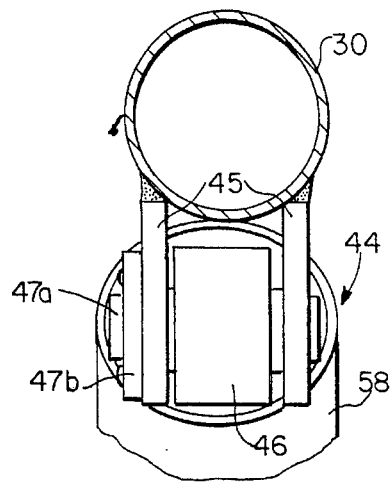
FIG. 10 is a partial cross-sectional view of the pivotal connection between the lower member and the upper member taken in the direction of arrows 10—10 in FIG. 1.

D-shaped upper band assembly halves 38a and 38b are provided with facing contoured surfaces that allow upper band assembly 38 to fit snugly around the outer diameter of light pole 20 when upper band assembly halves 38a and 38b are bolted together as shown in FIG. 8. A lower band assembly 42 similar to upper band assembly 38 also includes two D-shaped halves 42a and 42b. Lower band assembly 42 is clamped around the outer diameter of light pole 20 in a position located vertically below upper band assembly 38. Lower band assembly 42 provides a means for pivotally mounting lower member 40 to light pole 20. Lower member 40 extends from lower band assembly 42 up to an aluminum pivot assembly 44 located at the end 32 of upper member 30 near which light fixture 22 is attached. Aluminum pivot assembly 44 includes two parallel spaced aluminum plates 45 welded to upper member 30 as shown in FIG. 10, and between which a lug 46 at one end of lower member 40 can be pinned.

Figure 12:
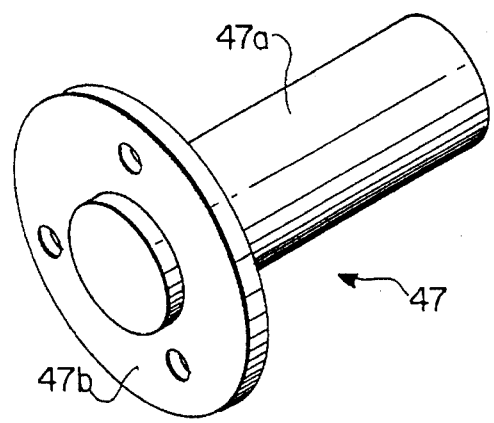
FIG. 12 is an isometric view of the pin assembly used in the pivotal connections between the lower member and the lower band assembly and between the lower member and the upper member.

Lower member 40 is pivotally attached at one end to lower band assembly 42 and at the other end to aluminum pivot assembly 44 by pin assemblies 47, shown in FIG. 12. Pin assemblies 47 each have a pin 47a and a circular end plate 47b that is welded across one end of pin 47a and provides means for attaching pin assembly 47 to lower band assembly 42 and aluminum pivot assembly 44. Oil-free flange bearings 36 are press fit into a transverse hole through each lug 46 from each side of the lug 46 located at both ends of lower member 40. Oil-free flange bearings 36 provide a bearing surface between the sides of lugs 46 and aluminum plates 45, and also between pin 47a and the surface defining the transverse hole through lug 46.

Figure 6:
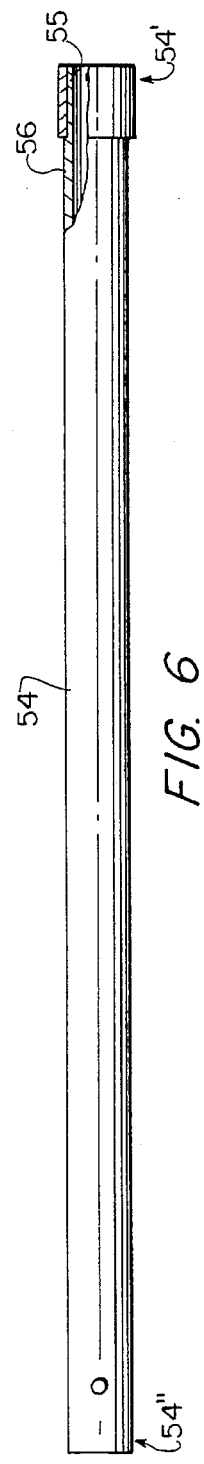
FIG. 6 is a side-elevation view of the inner tube of the lower member in partial cross-section showing the sleeve bearing pressed over one end of the inner tube.
Figure 7:
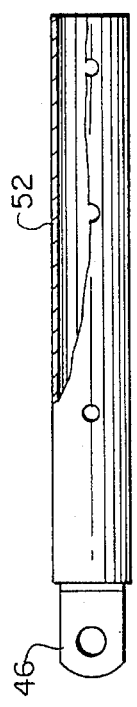
FIG. 7 is a side elevation view in partial cross-section of the lower tube assembly of the lower member.

Lower member 40 is made up of three telescoping members: a lower tube assembly 52 shown in FIG. 7; an inner tube 54 shown in FIG. 6; and an outer tube 58 shown in FIG. 5. Lower tube assembly 52 is provided with a lug 46 at one axial end. As discussed above, lug 46 has a transverse hole for receiving pin 47a of pin assembly 47 and also has oil-free flange bearings 36 press fit into the hole from both sides of lug 46.

Lower tube assembly 52 is dimensioned so as to slidably receive an inner tube 54 and is further provided with a plurality of transverse holes through which dowel pins or bolts can be passed in order to engage with a transverse hole through one end 54" of inner tube 54. The transverse holes through lower tube assembly 52 allow for an adjustment in the angle of upper member 30 relative to lighting pole 20 as inner tube 54 is moved telescopically and locked at different positions within lower tube assembly 52, thus changing the length of lower member 40.

As shown in FIGS. 4 and 6, the axial end 54' of inner tube 54 opposite from end 54" of inner tube 54 having a hole for attachment to lower Lube assembly 52 includes a reduced diameter portion 55 that allows for the press fit of a first sleeve bearing 56 over the axial end 54' of inner tube 54. First sleeve bearing 56 is an oil-free bearing, preferably of the type sold under the trademark "IGLIDE" by IGUS, Inc. The outer diameter of first sleeve bearing 56 after installation over the reduced diameter portion 55 of inner tube 54, fits snugly but slidably within the inner diameter of an outer tube 58 as shown in FIG. 4. During the assembly of lower member 40, first sleeve bearing 56 is press fit over reduced diameter portion 55 at the end 54' of inner tube 54 opposite from the end 54" of inner tube 54 having a hole for attachment of inner tube 54 inside of lower tube assembly 52.

Before inserting end 54' of inner tube 54 into outer tube 58, a coil spring 60 is inserted into outer tube 58. Coil spring 60 is trapped between end 54' of inner tube 54 having first sleeve bearing 56 pressed over its reduced diameter portion 55, and closed end 58" of outer tube 58.

After installing first sleeve bearing 56 on end 54' of inner tube 54, end 54' of inner tube 54 is slid into end 58' of outer tube 58. End 58' of outer tube 58 is provided with a counterbore dimensioned to accept a second press fit sleeve bearing 56. After end 54' of inner tube 54 with first sleeve bearing 56 is slid into outer tube 58, second sleeve bearing 56 is slid over the outer diameter of inner tube 54 from end 54" of inner tube 54 and press fit into the counterbore at end 58' of outer tube 58. With first sleeve bearing 56 at end 54' of inner tube 54 fitting snugly but slidably within the inner diameter of outer tube 58, and with second sleeve bearing 56 at end 58' of outer tube 58 fitting snugly but slidably over the outer diameter of inner tube 54, any telescopic motion between inner tube 54 and outer tube 58 is damped as a result of sliding friction between first and second sleeve bearings 56 and the inner diameter of outer tube 58 and the outer diameter of inner tube 54.

Coil spring 60 is selected such that the natural frequency of the assembly of lower member 40 and upper member 30 is considerably lower than would be the case if upper member 30 were simply rigidly attached to lighting pole 20. Vibrations passing through light pole 20 are reduced or eliminated before reaching lighting fixture 22 as a result of the telescopic motion between outer tube 58 and inner tube 54 of lower member 40, with such motion being resisted by coil spring 60 and damped by sleeve bearings 56.

Modifications and variations of the above-described embodiments of the present invention are possible, as appreciated by those skilled in the art in light of the above teachings. For example, the exact structure providing a pivotal connection between the upper and lower members and the lighting pole, and between the upper member and the lower member, can be varied.

It is therefore to be understood that, within the scope of the appended claims and their equivalents, the invention may be practiced otherwise than as specifically described.

List of Designators

20 light pole
22 lighting fixture
30 upper member
32 distal end of upper member
34 proximal end of upper member
35 connecting pipe segment
36 oil-free flange bearing
37 aluminum plates
38 upper band assembly
38a half of upper band assembly
38b half of upper band assembly
39 upper pin assembly
39a pin
39b end plate
40 lower member
42 lower band assembly
42a half of lower band assembly
42b half of lower band assembly
44 aluminum pivot assembly
45 aluminum plates
46 lug
47 pin assembly
47a pin
47b end plate List of Designators (continued)

52 lower tube assembly
54 inner tube
54' end of inner tube
54" end of inner tube
55 reduced diameter portion
56 sleeve bearing
58 outer tube
58' end of outer tube
58" end of outer tube
60 coil spring

What is claimed is:

1. A vibration isolating lighting pole bracket arm assembly comprising:

an upper, cantilevered member for supporting a lighting fixture;

a lower bracing member for damping vibrations transmitted to said lighting fixture;

said upper member having first connection means for being pivotally connected to a vertical lighting pole and second connection means for being pivotally connected to a first end of said lower, bracing member;

said lower bracing member comprising an inner tube having first and second ends and an outer tube having a closed end and an open end;

said inner tube having a first cylindrical sleeve bearing press fit over said first end of said inner tube and said first end of said inner tube with said first sleeve bearing being slidably received within said outer tube; and said outer tube having a second cylindrical sleeve bearing press fit into said open end of said outer tube with said second sleeve bearing being slidably engaged with an outer periphery of said inner tube.

2. The bracket arm assembly of claim 1 further including:

a coil spring with said coil spring being retained within said outer tube between said first end of said inner tube and said closed end of said outer tube.

3. The bracket arm assembly of claim 1 wherein said lower bracing member includes means for being pivotally connected to said lighting pole.

4. The bracket arm assembly of claim 3 wherein said means for pivotally connecting said lower bracing member to said lighting pole comprises an axially extending lug, and a pin assembly, said axially extending lug defining a transverse hole, oil-free flange bearings being press fit into said transverse hole, and said oil-free flange bearings forming a bearing surface between said pin assembly and said lug.

5. A vibration isolating lighting pole bracket arm assembly comprising:

a first arm having first and second ends and a second arm having first and second ends, at least one of said first ends of said first and second arms having means for being pivotally connected to a lighting pole, said second arm being connected to said first arm, said second arm comprising an inner member having first and second ends and an outer member having an open end and a closed end, said inner member telescoping within said outer member, means for biasing said inner member in an axial direction relative to said outer member, and friction means for damping relative motion between said inner and outer members, said friction means being mounted between an outer periphery of said inner member and an inner surface of said outer member.

6. The bracket arm assembly of claim 5 wherein:

said means for biasing said inner member includes a coil spring.

7. The bracket arm assembly of claim 6 wherein:

said friction means includes a cylindrical, oil-free sleeve bearing with said sleeve bearing being press fit over the outer periphery of said inner member.

8. The bracket arm assembly of claim 6 wherein:

said friction means includes a cylindrical, oil-free sleeve bearing with said sleeve bearing being press fit inside the inner surface of said outer member.

* * * * *